Patented Oct. 4, 1932

1,880,566

UNITED STATES PATENT OFFICE

MAX WEILER, OF WIESDORF-LEVERKUSEN, AND KARL BERRES, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONDENSATION PRODUCT FROM A NON-HYDROXYLATED BENZYL ALCOHOL

No Drawing. Application filed July 3, 1930, Serial No. 465,784, and in Germany July 5, 1929.

The present invention relates to a process of preparing condensation products from a non-hydroxylated benzyl alcohol or an ester thereof with a p-halogenated monohydroxybenzene compound containing at least one free position ortho to the hydroxy group; more particularly it relates to compounds of the probable general formula

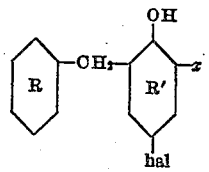

wherein $x$ stands for hydrogen, an alkyl or a benzyl radical or a halogen atom, "hal." stands for a halogen atom, wherein the benzene nucleus R may be substituted by halogen, alkyl or a sulfo hydroxy group, and wherein the benzene nucleus R' may be further substituted by halogen or alkyl.

Our new products are obtainable by condensing one molecular proportion of a p-halogenated monohydroxybenzene containing at least one free position ortho to the hydroxy group and which may be otherwise substituted by halogen or alkyl and one, or in case there are two free positions ortho to the hydroxy group of the p-halogenated monohydroxybenzene, two molecular proportions of a non-hydroxylated benzylalcohol or an ester thereof, which benzyl compound may be substituted by halogen, alkyl or a sulfo group, in the presence of an acid condensing agent. Such condensing agents are, for example, sulfuric acid, a mixture of concentrated hydrochloric and glacial acetic acid, zinc chloride or aluminium chloride. The temperature at which the reaction takes place varies within wide limits, but may range in most cases from about 30 to 160° C. The same is true regarding the time required for finishing the condensation process which may vary from about one hour to about two days. Our new products are generally colorless or nearly colorless powders, which are soluble in alkalies, difficultly soluble in water, excepting those which contain a sulfo group, and are highly efficacious in protecting wool, fur, hair and the like against moths and similar insect pests and in preventing and combating the growing of micro-organisms such as bacteria, moulds and the like.

The following examples will illustrate our invention without limiting it thereto.

*Example 1.*—40 parts by weight of benzylalcohol and 48 parts by weight of p-chlorophenol are treated at about 45 to 50° C. with a mixture of equal parts by weight of glacial acetic acid and 100% sulfuric acid until one or both components disappear. The mass is poured upon water, the reaction product, which is precipitated, is separated, dissolved in benzene and agitated with dilute caustic soda lye. The precipitate obtained by acidification of the caustic soda solution is freed by means of steam from any small amounts of chlorophenol still present.

*Example 2.*—53.7 parts by weight of o-chlorobenzyl chloride and 42.8 parts by weight of p-chlorophenol are heated with 4 parts by weight of zinc chloride for 24 hours at 45 to 50° C. and at 60° C. until the development of hydrochloric acid has ceased. The melt is poured upon water and treated with steam while weakly acid to Congo red. The precipitate from the steam residue is separated, extracted with caustic soda lye and again precipitated with sulfuric acid. By boiling with ligroin a difficultly soluble residue is obtained, which crystallizes from carbon tetrachloride in beautiful prisms. After estimation of the chlorine and molecular weight the new product is considered to be 2:6-bis-o-chlorobenzyl-4-chlorophenol. The viscous oil is obtained from the portion readily soluble in ligroin. After estimation the chlorine and molecular weight, the latter product is considered to be 2-o-chlorobenzyl-4-chlorophenol.

The process can be carried out in a similar manner by using instead of the o-chlorobenzyl chloride, for example, benzyl chloride, sulfobenzyl chloride prepared by chlorinating the sodium salt of para-toluene sulfonic acid and working up in the customary manner, as well as a trichlorobenzyl chloride mixture, which is obtainable by the chlorination of commercial trichloro toluene.

*Example 3.*—16.1 parts by weight of p-chlorobenzyl chloride and 14.2 parts by weight of 5-chloro-2-cresol are heated for about 24 hours at 45° C. with 2 parts by weight of zinc chloride. The melt is poured upon water, the separated precipitate is dissolved in benzene and extracted with caustic soda lye. The reaction product obtained by the acidification of the caustic soda solution is freed by means of steam from any small amounts of chlorocresol still present.

*Example 4.*—20 parts by weight of p-methylbenzylalcohol and 23.1 parts by weight of p-chlorophenol are heated with 0.5 parts by weight of zinc chloride until the beginning of the development of hydrochloric acid. After a further heating of about one hour at 140 to 150° C. the reaction mass is worked up as described in Example 3.

*Example 5.*—25 parts by weight of benzylacetate, 23.5 parts by weight of p-chlorophenol, 130 parts by weight of sulfuric acid 77° Bé. and 70 parts by weight of glacial acetic acid are well stirred for 48 hours at a temperature of 45° C. The reaction product is then worked up as described in Example 1. The product thus obtained is identical with that of Example 1.

*Example 6.*—50 parts by weight of 2.4.5-trichlorobenzyl-chloride, 30 parts by weight of p-chlorophenol and 2 parts by weight of aluminium chloride are heated for 6 hours at 45–50° C. The surplus of p-chlorophenol is blown off. The product thus obtained is dissolved in sodium lye and crystallized from carbon tetrachloride. It is a whitish crystalline powder.

We claim:

1. The process which comprises condensing about one or two molecular quantities of a non-hydroxylated benzyl alcohol or an ester thereof, which may be substituted in the nucleus by halogen, alkyl or a sulfo group, with one molecular quantity of a p-halogenated monohydroxy benzene containing at least one free position ortho to the hydroxy group, and which may be substituted by halogen or alkyl, in the presence of an acid condensing agent.

2. The process which comprises condensing about one or two molecular quantities of a non-hydroxylated benzylalcohol or an ester thereof, which may be substituted in the nucleus by halogen, alkyl or a sulfo group, with one molecular quantity of a p-halogenated monohydroxybenzene containing at least one free position ortho to the hydroxy group, and which may be substituted by halogen or alkyl, in the presence of an acid condensing agent at a temperature of about 30 to 160° C. and for a time ranging from one hour to two days.

3. The process which comprises condensing one or two molecular quantities of a non-hydroxylated benzyl alcohol or an ester thereof, which may be substituted in the nucleus by halogen, with one molecular quantity of a p-halogenated monohydroxybenzene containing at least one free position ortho to the hydroxy group, and which may be substituted by halogen, in the presence of a condensing agent at a temperature of about 30–160° C. and for a time of from one hour to two days.

4. The process which comprises condensing one molecular quantity of 2.4.5-trichlorobenzylchloride and one molecular quantity of p-chlorophenol in the presence of aluminium chloride at a temperature of about 45–50° C.

5. As new products compounds of the probable general formula:

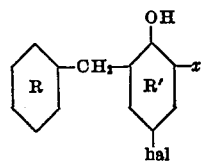

wherein $x$ stands for hydrogen, halogen, alkyl or a benzyl radical, "hal" stands for a halogen atom, wherein the benzene nucleus R may be substituted by halogen, alkyl or a sulfo group, and wherein the benzene nucleus R' may be further substituted by halogen or alkyl being generally colorless or nearly colorless powders, which are soluble in alkalies, difficultly soluble in water excepting those which contain a sulfo group and are highly efficacious in protecting wool, hair and the like against moths and similar insect pests and in preventing and combating the growing of micro-organisms.

6. As new products compounds of the probable general formula:

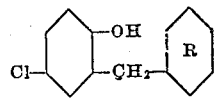

wherein the benzene nucleus R may be substituted by halogen, alkyl or a sulfo group being generally colorless or nearly colorless powders, which are soluble in akalies, difficultly soluble in water excepting those which contain a sulfo group and are highly efficacious in protecting wool, hair and the like against moths and similar insect pests and in preventing and combating the growing of micro-organisms.

7. As new products compounds of the probable general formula:

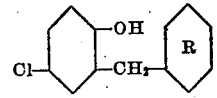

wherein the benzene nucleus R is substituted by chlorine atoms being generally colorless or nearly colorless powders, which are soluble in alkalies, difficultly soluble in water and are highly efficacious in protecting wool, hair and the like against moths and similar insect pests and in preventing and combating the growing of micro-organisms.

8. As new products the compound of the probable general formula:

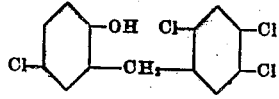

being a colorless crystalline substance soluble in caustic soda lye, benzene and alcohol and nearly insoluble in water and being highly efficacious in protecting wool, fur, hair and the like against moths and similar insect pests and in preventing and combating the growing of micro-organisms.

In testimony whereof, we affix our signatures.

MAX WEILER.
KARL BERRES.